United States Patent
Lindahl et al.

(10) Patent No.: US 7,093,795 B2
(45) Date of Patent: Aug. 22, 2006

(54) METHODS AND SYSTEMS FOR OPERATING AIRCRAFT LANDING GEARS

(75) Inventors: Gary M. Lindahl, Newcastle, WA (US); Steven J. Trotter, Kirkland, WA (US)

(73) Assignee: The Boeing Company, Seattle, WA (US)

( * ) Notice: Subject to any disclaimer, the term of this patent is extended or adjusted under 35 U.S.C. 154(b) by 55 days.

(21) Appl. No.: 11/000,167

(22) Filed: Nov. 30, 2004

(65) Prior Publication Data

US 2006/0027706 A1 Feb. 9, 2006

Related U.S. Application Data

(62) Division of application No. 10/774,981, filed on Feb. 9, 2004, now Pat. No. 6,854,689.

(51) Int. Cl.
  *B64C 25/26* (2006.01)
(52) U.S. Cl. .................................. 244/102 R
(58) Field of Classification Search ............. 244/81, 244/100 R, 102 R, 102 A, 102 SL, 190
  See application file for complete search history.

(56) References Cited

U.S. PATENT DOCUMENTS

| | | | |
|---|---|---|---|
| 2,293,198 A | | 8/1942 | Filmer |
| 2,401,097 A | * | 5/1946 | Parilla ................ 244/102 R |
| 2,452,251 A | | 10/1948 | Martin |
| 2,484,900 A | | 10/1949 | McPherson et al. |
| 2,487,548 A | | 11/1949 | Hawkins, Jr. |
| 2,538,878 A | | 1/1951 | Misulis |
| 2,552,843 A | | 5/1951 | Clifton et al. |
| 2,562,905 A | * | 8/1951 | Gadeberg ................ 244/91 |
| 2,592,905 A | | 4/1952 | Jacobs |
| 2,750,134 A | | 6/1956 | Hawkins, Jr. et al. |
| 2,752,112 A | | 6/1956 | Payne, Jr. |
| 2,772,060 A | | 11/1956 | Bendicsen |
| 3,485,465 A | * | 12/1969 | Churchill ............... 244/102 R |
| 3,511,455 A | * | 5/1970 | Weick .................... 244/102 R |
| 3,652,039 A | | 3/1972 | Lucien |
| 3,669,387 A | | 6/1972 | Lucien |
| 4,408,736 A | | 10/1983 | Kirschbaum |
| 4,568,045 A | * | 2/1986 | Mayer ..................... 244/102 R |
| 4,573,649 A | | 3/1986 | Yourkowski |
| 4,687,158 A | | 8/1987 | Kettering |
| 4,714,298 A | | 12/1987 | Mail |
| 4,845,804 A | | 7/1989 | Garrett |

(Continued)

FOREIGN PATENT DOCUMENTS

KR  98059390 A  10/1998

*Primary Examiner*—Robert P. Swiatek
(74) *Attorney, Agent, or Firm*—Perkins Coie LLP

(57) ABSTRACT

Methods and systems for performing landing gear operations. In one embodiment, a method for retracting a landing gear is useable with an aircraft having a gear door that at least partially covers a gear well when the landing gear is extended. The method can include receiving a first signal during movement of the aircraft down a runway for takeoff. The first signal can correspond to at least a first aspect of motion of the aircraft, such as upward rotation of the aircraft for liftoff. The gear door can be opened in response to receiving the first signal. The method can further include receiving a second signal after the aircraft has lifted off of the runway. The second signal can correspond to a second aspect of motion of the aircraft, such as the aircraft achieving a positive rate of climb. In response to receiving the second signal, the landing gear can be retracted into the gear well.

13 Claims, 4 Drawing Sheets

U.S. PATENT DOCUMENTS

| | | |
|---|---|---|
| 5,040,747 A | 8/1991 | Kane et al. |
| 5,955,972 A | 9/1999 | Wade |
| 6,027,070 A | 2/2000 | Zambelli |
| 6,345,786 B1 | 2/2002 | Sakurai |
| 6,352,221 B1 | 3/2002 | Sakurai |
| 6,499,005 B1 | 12/2002 | Gunderson et al. |
| 6,633,239 B1 | 10/2003 | Plude et al. |

* cited by examiner

METHODS AND SYSTEMS FOR OPERATING AIRCRAFT LANDING GEARS

CROSS-REFERENCE TO RELATED APPLICATIONS

This application is a divisional of U.S. application Ser. No. 10/774,981, filed Feb. 9, 2004 now U.S. Pat. No. 6,854,689.

TECHNICAL FIELD

The following disclosure relates generally to aircraft landing gear systems and, more particularly, to methods and systems for retracting aircraft landing gears.

BACKGROUND

Conventional jet transport aircraft typically include retractable landing gears to reduce aerodynamic drag during flight. Such landing gears can extend downwardly from a wing or fuselage for landing and retract upwardly into corresponding gear wells for flight. Many aircraft also include at least some form of gear door that closes over the gear wells when the landing gears are in the extended position. When closed, these gear well doors can protect systems within the gear wells from foreign object damage during takeoff and landing, and can reduce noise and drag. Throughout the following disclosure, unless otherwise noted, the term "gear doors" refers to gear well doors that at least partially cover gear wells after extension of the corresponding landing gear.

When a conventional jet transport aircraft begins its takeoff roll, the gear doors are typically closed and remain in this position until after liftoff. Under current practice, pilots wait until the aircraft has achieved a positive rate of climb before initiating landing gear retraction. This usually occurs about three seconds after liftoff. Landing gear retraction typically begins with the opening of the gear doors to expose the gear wells. Next, the landing gears retract upwardly into the corresponding gear wells. When the landing gears are fully retracted, or close to fully retracted, the gear doors begin closing behind the landing gears to cover the gear wells for flight.

Retracting the landing gears quickly after liftoff can provide a number of benefits. One benefit is the reduction in aerodynamic drag and the corresponding increase in climb-rate that results from "cleaning up" the aircraft. Another benefit is the additional clearance that retracting the landing gear can provide between the aircraft and ground obstacles during an obstacle-limited takeoff.

Conventional jet transport aircraft typically have hydraulically driven landing gear systems. On such aircraft, the demands of the landing gear system typically determines the size of the hydraulic system. One known method for increasing the speed of landing gear retraction is to increase the capacity of the hydraulic system. One downside to this approach, however, is the increased cost associated with a larger hydraulic system. A further downside is the reduction in aircraft performance that results from the increased weight of a larger hydraulic system.

SUMMARY

The present invention is directed generally toward aircraft landing gear systems and methods for retracting aircraft landing gears. A method in accordance with one aspect of the invention is usable for retracting a landing gear of an aircraft during takeoff. The aircraft can include a landing gear well configured to receive the landing gear as the landing gear moves from an extended position to a retracted position. The aircraft can further include at least one landing gear door moveable between a closed position and an open position. In the closed position, the landing gear door can at least partially cover the landing gear well. In this embodiment, the method for retracting the landing gear includes receiving a first signal during movement of the aircraft down a runway for takeoff. The first signal can correspond to at least a first aspect of motion of the aircraft. In response to receiving the first signal, movement of the landing gear door from the closed position to the open position is initiated.

Another aspect of this method includes receiving a second signal after the aircraft has lifted off of the runway. The second signal can correspond to at least a second aspect of motion of the aircraft different from the first aspect of motion. In response to receiving the second signal, movement of the landing gear from the extended position to the retracted position can be initiated.

In a particular aspect of this method, receiving the first signal during movement of the aircraft down the runway can include receiving a signal that is automatically generated in response to the aircraft rotating upwardly. In another aspect of this method, receiving a second signal after the aircraft has lifted off of the runway can include receiving a signal associated with a control input manually generated by a pilot of the aircraft in response to the aircraft achieving a positive rate of climb.

An aircraft system configured in accordance with one aspect of the invention includes a controller configured to be operably coupled to a landing gear door and a landing gear of an aircraft. The landing gear can be moveable between an extended position and a retracted position. The landing gear door can be moveable between a closed position and an open position. The controller can be configured to retract the landing gear by a method that includes receiving a first signal during movement of the aircraft down a runway for takeoff. The first signal can correspond to at least a first aspect of motion of the aircraft. In response to receiving the first signal, movement of the landing gear door from the closed position to the opened position is initiated. The method can further include receiving a second signal separate from the first signal after the aircraft has lifted off of the runway. The second signal can correspond to at least a second aspect of motion of the aircraft. In response to receiving the second signal, movement of the landing gear from the extended position to the retracted position can be initiated.

DETAILED DESCRIPTION

The following disclosure describes methods and systems for retracting aircraft landing gears. Certain details are set forth in the following description and in FIGS. 1–4 to provide a thorough understanding of various embodiments of the invention. Other details describing well-known structures and systems often associated with aircraft and aircraft landing gear systems are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
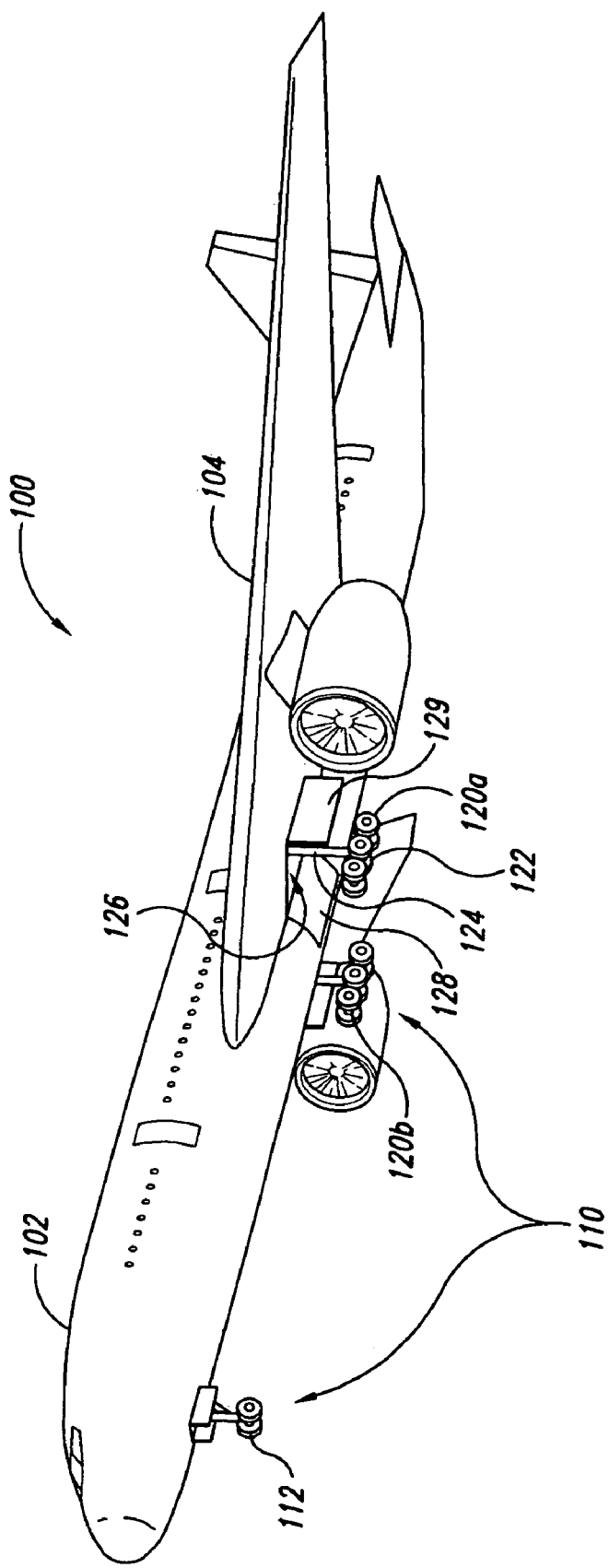
FIG. 1 is a bottom front isometric view of an aircraft having a landing gear system configured in accordance with an embodiment of the invention.

FIG. 1 is a bottom front isometric view of an aircraft 100 having a landing gear system 110 configured in accordance with an embodiment of the invention. In one aspect of this embodiment, the aircraft 100 includes a wing 104 extending outwardly from a fuselage 102. The landing gear system 110 can include a nose gear 112 extending downwardly from a forward portion of the fuselage 102, and two or more main gears 120 (identified individually as a first main gear 120a and a second main gear 120b) extending downwardly from the wing 104. Each main gear 120 can include a wheel truck 122 pivotally coupled to a main strut 124. The main strut 124 can be pivotally attached to the wing 104 and configured to retract inwardly and upwardly into a corresponding gear well 126. In the illustrated embodiment, the gear well 126 extends across a portion of the underside of the wing 104 and the fuselage 102.

In another aspect of this embodiment, the aircraft 100 further includes a first gear door 128 and a second gear door 129. The first gear door 128 can be hingeably attached to the fuselage 102 and moveable between a closed position (as illustrated in FIG. 1) and an open position (not shown). In the closed position, the first gear door 128 covers the portion of the gear well 126 that extends into the fuselage 102. In the open position, the gear well 126 can receive the retracting main gear 120. The second gear door 129 can be hingeably attached to the wing 104 and coupled to the main gear 120 so that it moves in conjunction with the main gear 120.

When the aircraft 100 begins moving down a runway for takeoff, the first gear door 128 ("gear door 128") is closed to protect systems within the fuselage portion of the gear well 126 from foreign object damage. As described in greater detail below, however, as the aircraft 100 approaches liftoff speed and begins to rotate upwardly, the gear door 128 starts to open. In this way, the gear door 128 can be fully open, or at least close to fully open, after liftoff when the pilot determines that the aircraft 100 has achieved a positive rate of climb and manually initiates the gear retraction process. By opening the gear door 128 in advance of the pilot initiating gear retraction, the overall time for gear retraction can be significantly reduced. In addition, as further described in detail below, by dovetailing the door opening and gear retraction operations together in sequence, the demands on the aircraft hydraulic system (not shown) can be reduced, thereby enabling use of a lighter and less expensive hydraulic system.

Figure 2:
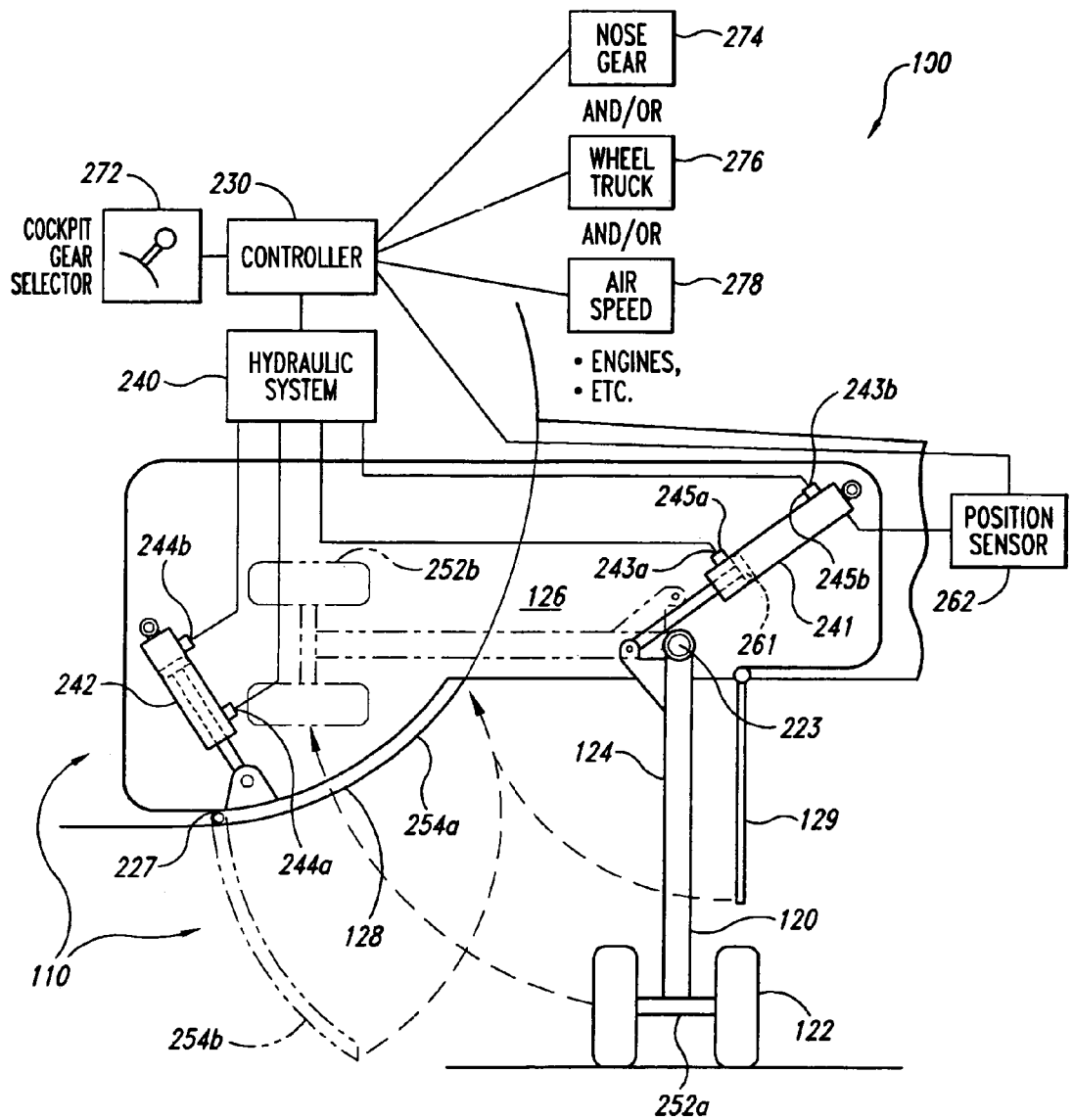
FIG. 2 is an enlarged, partially schematic, front cross-sectional view of a portion of the aircraft of FIG. 1 illustrating aspects of the landing gear system configured in accordance with an embodiment of the invention.

FIG. 2 is an enlarged, partially schematic, front cross-sectional view of a portion of the aircraft 100 illustrating aspects of the landing gear system 110 configured in accordance with an embodiment of the invention. In one aspect of this embodiment, the landing gear system 110 includes a hydraulic gear actuator 241 ("gear actuator 241") operably coupled to the main gear 120, and a hydraulic door actuator 242 ("door actuator 242") operably coupled to the gear door 128. The gear actuator 241 can include a first hydraulic fluid port 243a ("first fluid port 243a") and a second hydraulic fluid port 243b ("second fluid port 243b"). The first fluid port 243a and the second fluid port 243b are configured to receive pressurized hydraulic fluid from a hydraulic system 240 (shown schematically) for retraction and extension, respectively, of the gear actuator 241. For example, for retraction of the gear actuator 241, pressurized hydraulic fluid flows into the first fluid port 243a from the hydraulic system 240 and drives a piston 261 in a first direction causing it to retract. Conversely, for extension of the gear actuator 241, pressurized hydraulic fluid flows into the second fluid port 243b from the hydraulic system 240 and drives the piston 261 in the opposite direction causing the gear actuator 241 to extend. As the piston 261 moves in either direction, low pressure hydraulic fluid returns to the hydraulic system 240 via the fluid port 243 on the low pressure side of the piston 261. Retraction of the gear actuator 241 causes the main gear 120 to pivot upwardly about a trunnion 223 from an extended position 252a to a retracted position 252b. In the retracted position, the main gear 120 is neatly stowed within the gear well 126. Conversely, extension of the gear actuator 241 causes the main gear 120 to return to the extended position 252a.

In another aspect of this embodiment, the gear actuator 241 further includes a first snubber valve 245a operably coupled to the first fluid port 243a, and a second snubber valves 245b operably coupled to the second fluid port 243b. The snubber valves 245 can be either mechanically or electrically actuated to restrict the flow of hydraulic fluid through the respective fluid ports 243 when the piston 261 approaches either end of its stroke. Restricting the flow of hydraulic fluid in this manner slows ("snubs") the piston 261 near the ends of its stroke. Gradually slowing the piston 261 near the end of its stroke can prevent damage to the main gear 120 that might otherwise occur if the main gear 120 is rapidly driven into stops at either the extended position 252a or the retracted position 252b.

In a further aspect of this embodiment, the landing gear system 110 additionally includes a position sensor 262 (shown schematically) operably coupled to the gear actuator 241. In one embodiment, the position sensor 262 can be configured to detect when snubbing of the piston 261 has begun during retraction of the gear actuator 241. As described in greater detail below, when snubbing of the piston 261 begins, the demand placed on the hydraulic system 240 by the gear actuator 241 is gradually reduced. As a result, the hydraulic system 240 can begin providing power to the door actuator 242 at this point in time without having to increase its output, i.e., by maintaining a level hydraulic load. In one embodiment, the position sensor 262 can include an electrical device, such as an LVDT (linear variable displacement transducer), to detect piston snubbing. In other embodiments, other types of devises, such as a simple mechanically operated switch, can be employed for this purpose.

In yet another aspect of this embodiment, the door actuator 242 includes a first hydraulic fluid port 244a and a second hydraulic fluid port 244b configured to receive pressurized hydraulic fluid from the hydraulic system 240 for closing and opening, respectively, the gear door 128. For example, pressurized hydraulic fluid flowing into the first fluid port 244a causes the door actuator 242 to retract. Conversely, pressurized hydraulic fluid flowing into the second fluid port 244b causes the door actuator 242 to extend. Extension of the door actuator 242 causes the gear door 128 to open downwardly about a hinge-line 227 moving from a closed position 254a to an open position 254b. Conversely, retraction of the door actuator 242 causes the gear door 128 to move in the opposite direction.

In a further aspect of this embodiment, the landing gear system 110 additionally includes a controller 230 (shown schematically) operably coupled to the hydraulic system 240. The controller 230 can be configured to receive input signals from a number of different sources, and then transmit corresponding control signals to the hydraulic system 240 for operation of the main gear 120 and the gear door 128. For example, in one embodiment the controller 230 can receive manually generated input signals from a cockpit gear selector 272 (shown schematically). In another embodiment, the controller 230 can receive automatically generated input signals from a nose gear sensor 274, a wheel truck sensor 276, and/or an air speed sensor 278 (all shown schematically).

In yet another aspect of this embodiment, the nose gear sensor 274, the wheel truck sensor 276, and the air speed sensor 278 have other arrangements and can be utilized to automatically transmit a signal to the controller 230 when a particular aspect of aircraft motion indicates that the aircraft 100 is approaching liftoff during a takeoff roll. For example, the nose gear sensor 274 can be configured to automatically transmit a signal to the controller 230 when the weight on the nose gear 112 (FIG. 1) decreases to a preselected amount. Alternatively, the wheel truck sensor 276 can be configured to automatically transmit a signal to the controller 230 when the wheel truck 122 rotates to a preselected angle with respect to the main strut 124. The foregoing signals generated by the nose gear sensor 274 and the wheel truck sensor 276 can correspond to the aircraft 100 rotating upwardly during its takeoff roll just before liftoff. In yet another embodiment, the air speed sensor 278 can be configured to automatically transmit a signal to the controller 230 when the aircraft 100 reaches a preselected air speed corresponding to liftoff. In other embodiments, other sensors can be used to provide other signals corresponding to liftoff. For example, in another embodiment, a main gear sensor can be included to provide a signal when the weight on the main gears 120 decreases to a preselected amount.

As the aircraft 100 is moving down a runway prior to takeoff, the main gear 120 is extended and the gear door 128 is closed as shown in FIG. 2. As the aircraft 100 builds up speed, one or more of the sensors 274, 276 or 278 can automatically transmit a signal to the controller 230 when the aircraft 100 is just about to lift off the runway. As discussed above, in one embodiment, this signal can be generated by the nose gear sensor 274 when the weight on the nose gear decreases to a preselected amount. Alternatively, this signal can be generated by the wheel truck sensor 276 when the angle between the wheel truck 122 and the main strut 124 reaches a preselected angle. In yet another embodiment, the signal that the aircraft 100 is just about to lift off can be automatically generated by the air speed sensor 278 when the air speed of the aircraft 100 reaches liftoff speed. In other embodiments, other signals can be used to indicate that the aircraft 100 is just about to lift off of the runway. For example, in one other embodiment, an engine speed signal can be used for this purpose. In a further embodiment, a weight sensor coupled to one or both of the main gears 120 can be used for this purpose. In yet another embodiment, an inclinometer mounted to the airframe can be used. Accordingly, in still further embodiments, other signals can be transmitted to the controller 230 when the aircraft 100 is at or near the point of lifting off of the runway.

When the controller 230 receives the signal indicating that the aircraft 100 is just about to lift off, the controller 230 sends a corresponding control signal to the hydraulic system 240 instructing the hydraulic system 240 to initiate opening of the gear door 128. The hydraulic system 240 responds by extending the door actuator 242 causing the gear door 128 to open. Accordingly, the gear door 128 opens just before or during liftoff of the aircraft 100, and before the pilot (not shown) has manually initiated landing gear retraction by operating the cockpit gear selector 272.

Once the pilot has determined that the aircraft 100 has achieved a positive rate of climb, the pilot initiates landing gear retraction by manual operation of the cockpit gear selector 272. This event typically occurs two to three seconds after the aircraft 100 has lifted off of the runway. At this point in time, the gear door 128 is fully open, or close to fully open. As a result, when the pilot initiates landing gear retraction, the main gear 120 can immediately begin moving into the gear well 126 without having to wait for the gear door 128 to open.

As the main gear 120 approaches the fully retracted position 252b, the first snubber valve 245a gradually restricts the flow of hydraulic fluid into the first fluid port 243a, thereby slowing retraction of the first actuator 241. In a further aspect of this embodiment, the position sensor 262 detects the start of actuator snubbing and transmits a corresponding signal to the controller 230. In response, the controller 230 transmits a control signal to the hydraulic system 240 instructing the hydraulic system to initiate movement of the gear door 128 from the open position 254b to the closed position 254a. The hydraulic system 240 responds by gradually increasing the flow of hydraulic fluid to the door actuator 242 causing the door actuator 242 to retract. In one embodiment, this motion can be accomplished by a separate door control valve, or by an "easy-on" snubbing valve within the door actuator 242. By gradually increasing the flow of hydraulic fluid to the door actuator 242 at the same rate as the flow of hydraulic fluid to the gear actuator 241 is decreasing, the demand on the hydraulic system 240 is maintained at an at least approximately constant level (i.e., the hydraulic system 240 is "level-loaded"). Once the main gear 120 is fully retracted, the gear door 128 closes behind it.

One feature of aspects of the invention described above with reference to FIG. 2 is that opening of the gear door 128 is automatically initiated before the pilot initiates retraction of the main gear 120. One advantage of this feature is that the main gear 120 can begin retracting immediately, or almost immediately, after the pilot initiates main gear retraction. In contrast, conventional landing gear systems are configured to respond to the pilot's gear retraction command by first opening the gear door 128, and then retracting the main gear 120. As a result, conventional landing gear systems take significantly longer to retract the main gear 120 than the landing gear system 110 described above with reference to FIG. 2. A further feature of aspects of the invention described above with reference to FIG. 2 is that the load on the hydraulic system 240 can be maintained at an at least approximately constant level during retraction of the main gear 120. This "level-loading" is achieved by gradually increasing the flow of hydraulic fluid to the door actuator 242 for door closure as the flow of hydraulic fluid to the gear actuator 241 for gear retraction is decreasing. One advantage of this feature is that the hydraulic system does not have to be sized to provide full power to both the door actuator 242 and the gear actuator 241 at the same time.

Figure 3:
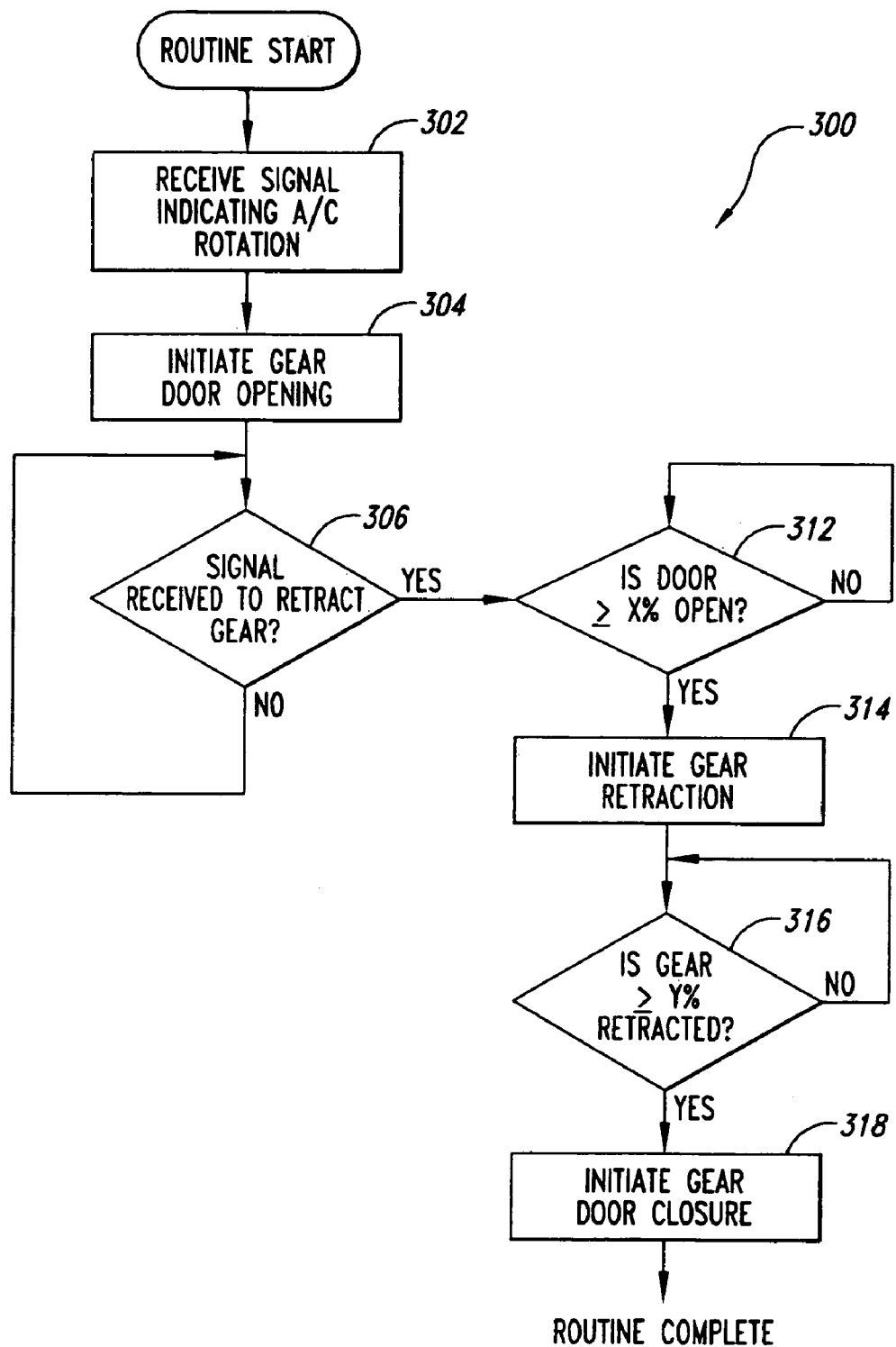
FIG. 3 illustrates a flow diagram of a routine for retracting a landing gear in accordance with an embodiment of the invention.

FIG. 3 illustrates a flow diagram of a routine 300 for retracting an aircraft landing gear in accordance with an embodiment of the invention. In one aspect of this embodiment, the controller 230 of FIG. 2 can include a computer processor that implements the routine 300 in accordance with instructions stored on a computer-readable medium. In other embodiments, the routine 300 can be implemented by other aircraft systems using other media. The routine 300 starts when the aircraft (not shown) begins moving down the runway for takeoff with the landing gear down and the corresponding gear door closed. In block 302, the routine 300 receives a signal indicating that the aircraft has begun upward rotation for liftoff. As discussed above with reference to FIG. 2, this signal can be automatically generated when the load on the nose gear decreases to a preselected level, when the wheel truck reaches a preselected angle relative to the main gear strut, and/or when the air speed of the aircraft reaches a preselected speed. In block 304, the routine 300 initiates opening of the gear door in response to receiving the signal in block 302.

In decision block 306, the routine 300 determines if it has received a signal from the pilot to retract the landing gear. In one embodiment, as discussed above, this signal can come from the pilot via actuation of a cockpit gear selector. If the routine 300 has not received a signal to retract the landing gear, then the routine waits until such a signal is received. When the routine 300 does receive a signal to retract the landing gear, the routine proceeds to decision block 312 to determine if the gear door is at least X % open. In one aspect of this embodiment, X can correspond to that percentage of door movement at which the gear door is sufficiently open such that the landing gear can be safely retracted without striking the gear door. For example, in one embodiment, X % may need to be at least approximately 75% before initiating landing gear retraction. In other embodiments, the percentage of door opening can vary depending on the particular landing gear configuration. If, in decision block 312, the gear door is not at least X % open, then the routine 300 repeats until the gear door is at least X % open. Once the gear door is at least X % open, the routine proceeds to block 314 and initiates retraction of the landing gear.

After initiating landing gear retraction, the routine 300 proceeds to decision block 316 and waits for the landing gear to be retracted at least Y %. In one embodiment, Y % corresponds to that percentage of landing gear retraction at which snubbing of the landing gear motion begins. As discussed above with reference to FIG. 2, the onset of landing gear snubbing can be detected with a mechanical or electromechanical position sensor operably coupled to the landing gear actuator. In one embodiment, Y % can be at least approximately 90%. In other embodiments, landing gear snubbing can occur at different percentages of landing gear motion depending on the particular landing gear configuration. If the landing gear is not at least Y % retracted, then the routine 300 repeats until the landing gear is at least approximately Y % retracted. Once the landing gear has been retracted to the point at which snubbing begins, the routine 300 proceeds to block 318 and initiates closure of the gear door. As discussed above, in one embodiment, hydraulic power to the gear door actuator is gradually increased as hydraulic power to the landing gear actuator is gradually decreased. After block 318, the routine 300 is complete.

Although one or more of the routines described above initiate opening of the landing gear door while the aircraft is still on the runway, in other embodiments, initiation of landing gear door opening can begin after the aircraft has lifted off the runway. For example, in one embodiment, a signal for gear door opening can be automatically generated when there is no weight on the landing gear, or shortly thereafter, indicating that the aircraft has just lifted-off. In other embodiments, other types of signals can be automatically or manually generated to initiate gear door opening after the aircraft has lifted-off the runway. These signals can be generated in a different manner than the signal received to initiate landing gear retraction.

Figure 4:
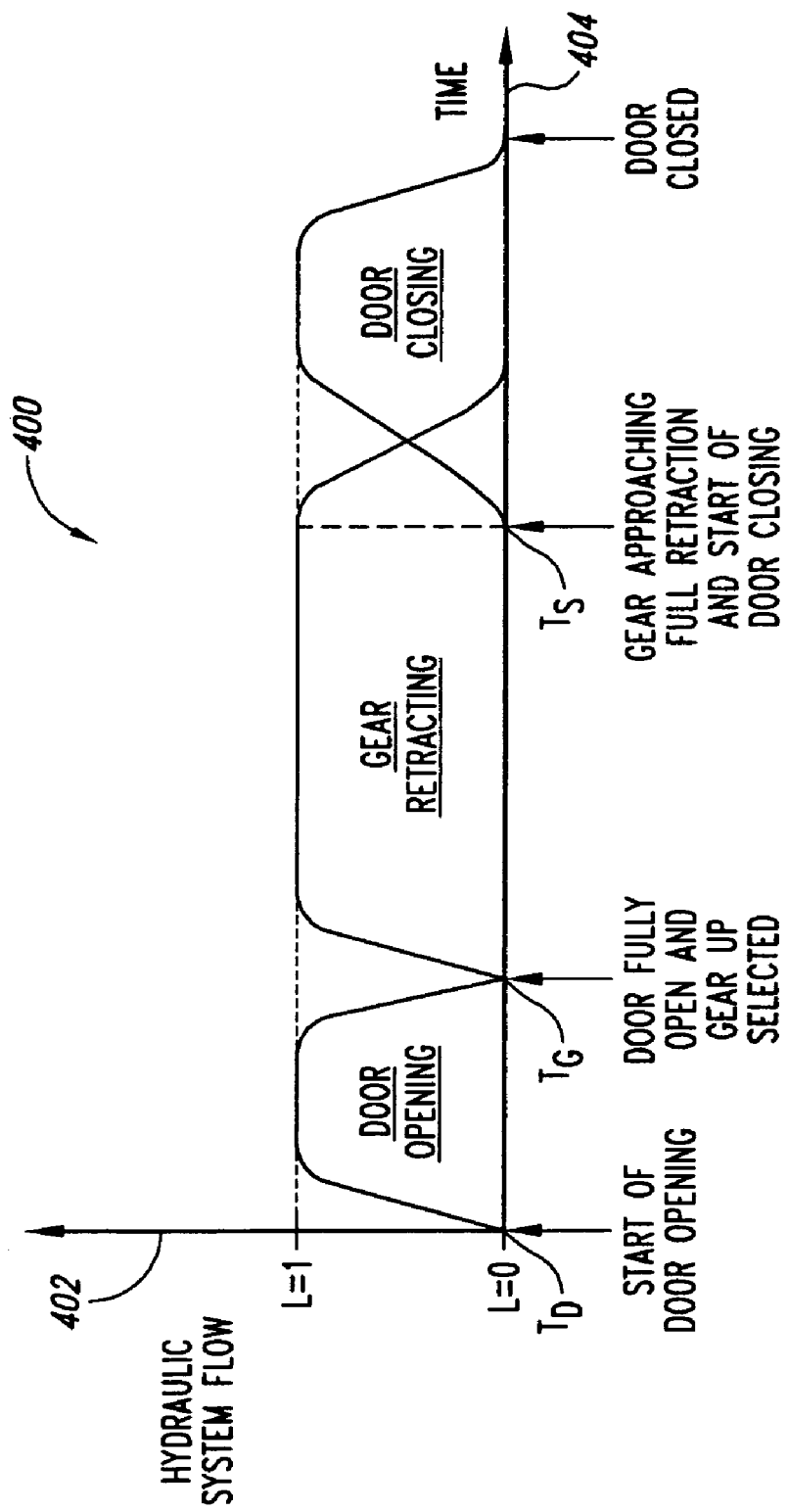
FIG. 4 is a graph that illustrates level-loading of a landing gear hydraulic system in accordance with an embodiment of the invention.

FIG. 4 is a graph 400 illustrating level-loading of a landing gear hydraulic system in accordance with an embodiment of the invention. The graph 400 includes a vertical axis 402 measuring hydraulic system flow, and a horizontal axis 404 measuring time. In one embodiment, the events illustrated by the graph 400 can correspond to the different landing gear retraction events described above with reference to FIGS. 1–3. For purposes of illustration, opening of the gear door begins with aircraft rotation at Time=$T_D$. From this point, hydraulic system flow increases rapidly from L=0 to level L=1. The hydraulic system flow maintains this level until the gear door is at least approximately fully open, at which time the flow to the gear door actuator decreases rapidly to at least approximately L=0.

In the illustrated embodiment, the pilot initiates retraction of the landing gear at $T_G$, which is about the same time the gear door is fully opened. As mentioned above, the pilot typically initiates gear retraction after the aircraft achieves a positive rate of climb. While this can occur at about the same time the gear door is fully open (as illustrated in FIG. 4), in other embodiments, the pilot can initiate landing gear retraction at other times, such as after the gear door is fully open or slightly before the gear door is fully open. When the pilot initiates landing gear retraction, the hydraulic flow increases rapidly back up to the level L=1. The hydraulic system maintains this flow level while the landing gear is retracting and until snubbing of the landing gear motion begins at $T_s$. At $T_s$, hydraulic flow to the landing gear actuator for landing gear retraction begins to decrease. At the same time, hydraulic flow to the gear door actuator for closure of the gear door begins to increase. In this manner, the load on the hydraulic system is maintained at an at least approximately constant level. When the hydraulic flow to the landing gear actuator has stopped, the hydraulic flow to the gear door actuator is at the level L=1 and maintains this level until snubbing of the gear door actuator begins, at which time hydraulic flow to the gear door actuator decreases down to the level L=0.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An aircraft system comprising:
   landing gear movable between an extended position and a retracted position, wherein the landing gear is at least partially stowed in a gear well when the landing gear is in the retracted position;
   a landing gear door movable between an open position and a closed position, wherein the landing gear door at least partially covers the gear well when the landing gear door is in the closed position;
   at least a first actuator operably coupled to the landing gear and configured to move the landing gear between the extended position and the retracted position;
   at least a second actuator operably coupled to the landing gear door and configured to move the landing gear door between the open position and the closed position; and
   a controller operably coupled to the first and second actuators, wherein the controller causes the second actuator to open the gear door in response to a first signal, and wherein the controller further causes the first actuator to retract the landing gear in response to a second signal different from the first signal.

2. The aircraft system of claim 1 wherein the controller causes the second actuator to open the gear door in response to an automatically generated signal, and wherein the controller further to causes the first actuator to retract the landing gear in response to a manually generated signal.

3. The aircraft system of claim 1 wherein the controller causes the second actuator to open the gear door in response to a signal that is automatically generated by an aspect of aircraft motion, and wherein the controller further causes the first actuator to retract the landing gear in response to a signal that is manually generated.

4. The aircraft system of claim 1 wherein the controller causes the second actuator to open the gear door in response to a signal that is automatically generated by aircraft rotation, and wherein the controller is further the first actuator to retract the landing gear in response to a signal that is manually generated when the aircraft achieves a positive rate of climb.

5. The aircraft system of claim 1 wherein the first and second actuators are hydraulic actuators, wherein the aircraft system further comprises a hydraulic system operably coupled to the first and second actuators, and wherein the controller is operably coupled to the hydraulic system, the controller causing the hydraulic system to move the second actuator and open the gear door in response to a first signal, the controller further causing the hydraulic system to move the first actuator and retract the landing gear in response to a second signal different from the first signal.

6. The aircraft system of claim 5 wherein the controller level-loads the hydraulic system during retraction of the landing gear and closure of the gear door such that the flow of hydraulic fluid is maintained at or below an at least approximately constant level.

7. An aircraft comprising:
   a fuselage;
   a passenger cabin positioned in the fuselage;
   a wing extending outwardly from the fuselage;
   a landing gear attached to the wing, the landing gear being movable between an extended position and a retracted position, wherein the landing gear is at least partially stowed in a gear well when the landing gear is in the retracted position;
   a landing gear door movable between an open position and a closed position, wherein the landing gear door at least partially covers the gear well when the landing gear door is in the closed position;
   at least a first actuator operably coupled to the landing gear and configured to move the landing gear between the extended position and the retracted position;
   at least a second actuator operably coupled to the landing gear door and configured to move the landing gear door between the open position and the closed position; and
   a controller operably coupled to the first and second actuators, wherein the controller causes the second actuator to open the gear door in response to an automatically generated signal, and wherein the controller further causes the first actuator to retract the landing gear in response to a manually generated signal.

8. The aircraft system of claim 7 wherein the controller causes the second actuator to open the gear door in response to a signal that is automatically generated by an aspect of aircraft motion.

9. The aircraft system of claim 7 wherein the controller causes the second actuator to open the gear door in response to a signal that is automatically generated by aircraft rotation.

10. The aircraft system of claim 7 wherein the controller causes the second actuator to open the gear door in response to a signal that is automatically generated when weight is lifted off of the landing gear.

11. The aircraft system of claim 7 wherein the controller causes the first actuator to retract the landing gear in response to a signal that is manually generated when the aircraft achieves a positive rate of climb.

12. The aircraft system of claim 7 wherein the first and second actuators are hydraulic actuators, wherein the aircraft system further comprises a hydraulic system operably coupled to the first and second actuators, and wherein the controller is operably coupled to the hydraulic system, the controller causing the hydraulic system to move the second actuator and open the gear door in response to a first signal, the controller further causing the hydraulic system to move the first actuator and retract the landing gear in response to a second signal different from the first signal.

13. The aircraft system of claim 12 wherein the controller level-loads the hydraulic system during retraction of the landing gear and closure of the gear door such that the flow of hydraulic fluid is maintained at or below an at least approximately constant level.

* * * * *